(12) United States Patent
Shuck

(10) Patent No.: US 10,478,920 B2
(45) Date of Patent: Nov. 19, 2019

(54) DUAL WALL COMPONENTS FOR GAS TURBINE ENGINES

(71) Applicant: Rolls-Royce Corporation, Indianapolis, IN (US)

(72) Inventor: Quinlan Y. Shuck, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 1078 days.

(21) Appl. No.: 14/847,571

(22) Filed: Sep. 8, 2015

(65) Prior Publication Data

US 2016/0090845 A1 Mar. 31, 2016

Related U.S. Application Data

(60) Provisional application No. 62/056,665, filed on Sep. 29, 2014.

(51) Int. Cl.
| | |
|---|---|
| *B23K 26/34* | (2014.01) |
| *B23K 26/32* | (2014.01) |
| *B23K 26/342* | (2014.01) |
| *B23K 26/70* | (2014.01) |
| *B23K 26/144* | (2014.01) |
| *B23K 26/244* | (2014.01) |

(Continued)

(52) U.S. Cl.
CPC .............. *B23K 26/34* (2013.01); *B22F 3/105* (2013.01); *B22F 5/009* (2013.01); *B22F 5/04* (2013.01); *B22F 7/08* (2013.01); *B23K 26/142* (2015.10); *B23K 26/144* (2015.10); *B23K 26/244* (2015.10); *B23K 26/32* (2013.01); *B23K 26/324* (2013.01); *B23K 26/342* (2015.10); *B23K 26/702* (2015.10); *F01D 5/187* (2013.01); *F01D 5/189* (2013.01); *B23K 2101/001* (2018.08); *B23K 2103/14* (2018.08); *B23K 2103/18* (2018.08); *B23K 2103/26* (2018.08); *B23K 2103/52* (2018.08); *F05D 2260/204* (2013.01)

(58) Field of Classification Search
CPC .. B22F 3/105; B22F 5/009; B22F 5/04; B22F 7/08; B23K 2101/001; B23K 2103/14; B23K 2103/18; B23K 2103/26; B23K 2103/52; B23K 26/142; B23K 26/144; B23K 26/244; B23K 26/32; B23K 26/324; B23K 26/34; B23K 26/342; B23K 26/702; B23K 26/0093; F01D 5/187; F01D 5/189; F01D 5/147; F05D 2260/204; F23R 3/06
USPC .......... 416/96 R; 415/177; 431/352; 428/457
See application file for complete search history.

(56) References Cited

U.S. PATENT DOCUMENTS

| 3,706,203 A | 12/1972 | Goldeberg et al. |
|---|---|---|
| 3,806,276 A | 4/1974 | Aspinwall |

(Continued)

FOREIGN PATENT DOCUMENTS

| CN | 105091030 A | 11/2015 |
|---|---|---|
| EP | 1503144 A1 | 2/2005 |

(Continued)

*Primary Examiner* — Mark A Laurenzi
*Assistant Examiner* — Paul W Thiede
(74) *Attorney, Agent, or Firm* — Shumaker & Sieffert, P.A.

(57) ABSTRACT

A dual wall component for use in a gas turbine engine and a method for making the same are disclosed herein. The dual wall component includes an inner support wall and an outer shield wall that extends around the inner support wall to act as a heat shield for the inner support wall.

18 Claims, 3 Drawing Sheets

(51) Int. Cl.
*B22F 5/04* (2006.01)
*F01D 5/18* (2006.01)
*B22F 3/105* (2006.01)
*B22F 7/08* (2006.01)
*B23K 26/324* (2014.01)
*B23K 26/142* (2014.01)
*B22F 5/00* (2006.01)
*B23K 101/00* (2006.01)
*B23K 103/14* (2006.01)
*B23K 103/18* (2006.01)
*B23K 103/00* (2006.01)

(56) References Cited

U.S. PATENT DOCUMENTS

| | | | | |
|---|---|---|---|---|
| 4,695,247 | A * | 9/1987 | Enzaki | F23R 3/06 431/352 |
| 5,017,753 | A | 5/1991 | Deckard | |
| 5,381,944 | A | 1/1995 | Makowiecki et al. | |
| 5,474,227 | A | 12/1995 | Krengel et al. | |
| 5,902,498 | A | 5/1999 | Mistry et al. | |
| 6,602,053 | B2 | 8/2003 | Subramanian et al. | |
| 6,797,914 | B2 | 9/2004 | Speranza et al. | |
| 7,975,902 | B2 | 7/2011 | Wilden et al. | |
| 8,800,298 | B2 | 8/2014 | Ladd et al. | |
| 2003/0026697 | A1 | 2/2003 | Subramanian et al. | |
| 2010/0284798 | A1 * | 11/2010 | Campbell | F01D 5/147 415/177 |
| 2011/0185739 | A1 | 8/2011 | Bronson et al. | |
| 2014/0242400 | A1 * | 8/2014 | Hoebel | B23K 26/0093 428/457 |
| 2014/0302278 | A1 | 10/2014 | Bunker | |
| 2016/0032766 | A1 | 2/2016 | Bunker et al. | |

FOREIGN PATENT DOCUMENTS

| | | |
|---|---|---|
| EP | 1528322 A2 | 5/2005 |
| WO | 2015147929 A2 | 10/2015 |

\* cited by examiner

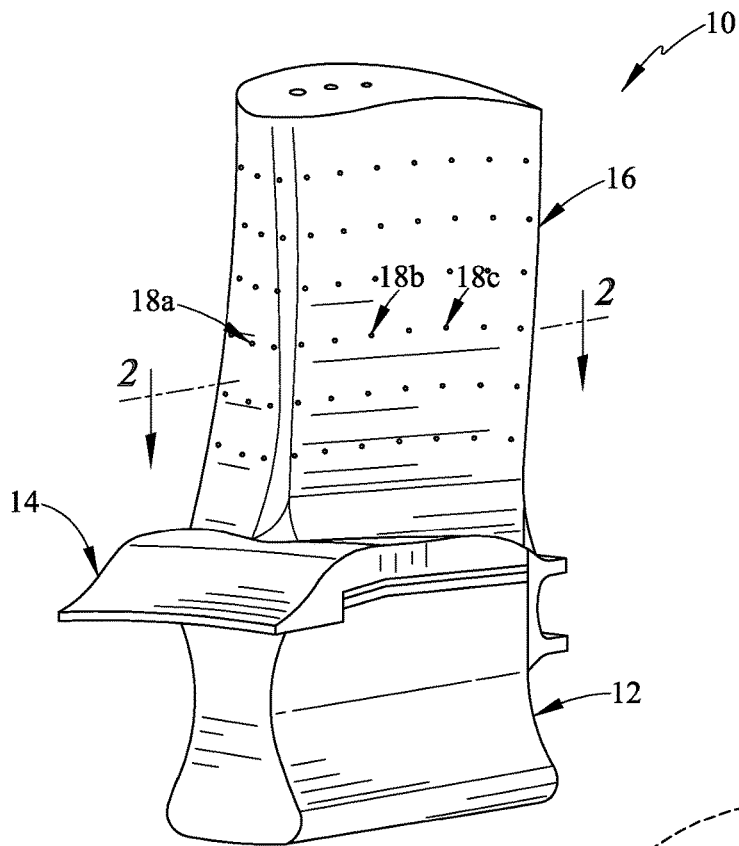
FIG. 1
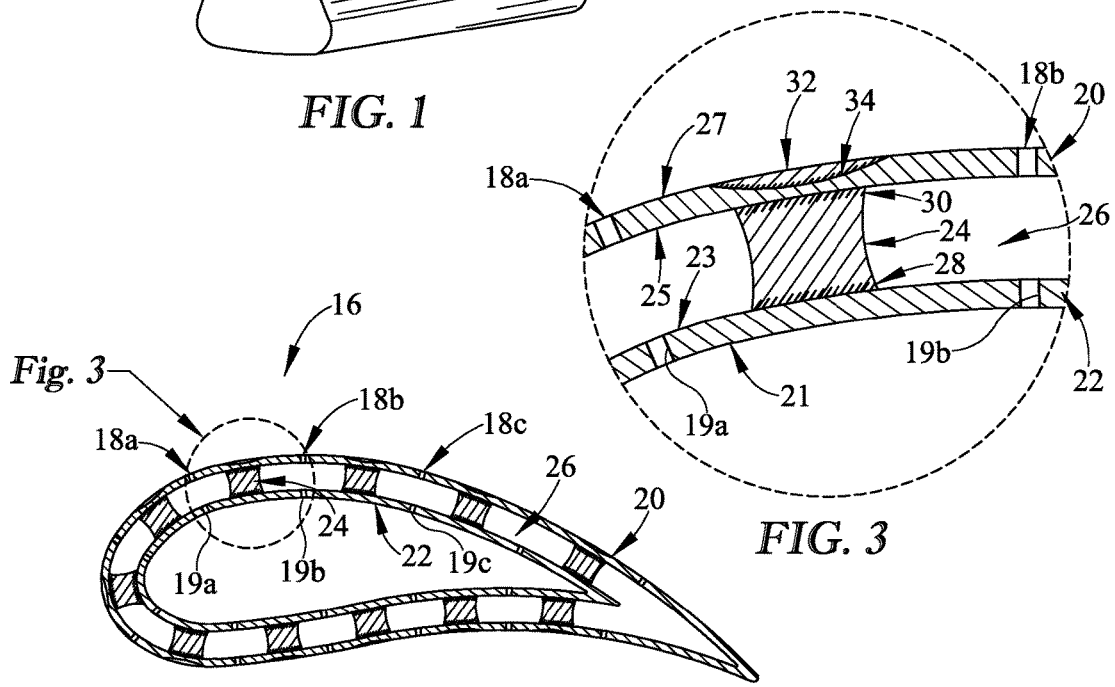
FIG. 3
FIG. 2

DUAL WALL COMPONENTS FOR GAS TURBINE ENGINES

CROSS REFERENCE TO RELATED APPLICATIONS

This application claims priority to and the benefit of U.S. Provisional Patent Application No. 62/056,665, filed 29 Sep. 2014, the disclosure of which is now expressly incorporated herein by reference.

FIELD OF THE DISCLOSURE

The present disclosure relates generally to gas turbine engines, and more specifically to dual wall components used in gas turbine engines.

BACKGROUND

Gas turbine engines may include dual wall components such as turbine blades, compressor blades, and combustor tiles. In a dual wall component, an inner wall may be needed to provide support to the component and an outer wall may be needed to act as a heat shield, shielding the inner wall from a heat source. A pedestal or pad may be used between the inner wall and outer wall to create a space between the inner wall and outer wall or the pedestal may be used to transmit the load between the inner wall and outer wall. These components may be used in areas of high temperature within the gas turbine engine.

Dual wall components for gas turbine engines may be produced by investment casting with ceramic cores or by bonding two different components together. Investment casting with ceramic cores may require subsequent removal of the cores.

SUMMARY

The present disclosure may comprise one or more of the following features and combinations thereof.

According to an aspect of the present disclosure a method of producing a dual wall component for a gas turbine engine is taught. The method comprising, depositing powder feedstock at predetermined positions on an inner wall, applying a first directed energy beam onto the powder feedstock to create pedestals and form inner weld joints between an outer surface of the inner wall and the pedestals and positioning an outer wall on the pedestals. The method may further include welding the pedestals to an inner surface of the outer wall by applying a second directed energy beam onto an outer surface of the outer wall at predetermined positions corresponding to the pedestals to form outer weld joints between an inner surface of the outer wall and the pedestals.

In some embodiments the first directed energy beam and the second directed energy beam may be supplied by a single energy source. In some embodiments powder feedstock may be deposited using blown powder directed energy deposition. The method may further comprise depositing a powder fill onto the outer surface of the inner wall between the pedestals to support the outer wall when the outer wall is positioned on the pedestals and to assist with welding the inner surface of the outer wall to the pedestal. In some embodiments the powder feedstock may be a nickel-based superalloy or a cobalt-based superalloy.

In some embodiments the method may further comprise removing a leftover portion of the powder feedstock after formation of the inner weld joint between the pedestal and the outer surface of the inner wall and after formation of the outer weld joint between the pedestal and the inner surface of the outer wall. Removing the leftover portion of the powder fill may be performed by suspending the powder in a liquid. Removing the powder feedstock comprises pumping fluid between the inner wall and the outer wall.

In some embodiments concave features may be formed along the outer surface of the outer wall. In some embodiments the method may further comprise filling in the concave features along the outer surface of the outer wall with a powder fill and applying a third directed energy beam with a single energy source to the powder fill to create a fill cap weld joint to form a smooth surface along the outer surface of the outer wall.

According to another aspect of the present invention an airfoil for use in a gas turbine engine is taught. The airfoil comprising an inner wall, an outer wall that extends around the inner wall to act as a heat shield for the inner wall, and a plurality of spaced apart pedestals welded to an outer surface of the inner wall to form an inner weld joint and welded to an inner surface of the outer wall to form an outer weld joint, wherein the pedestals transmit loads between the inner wall and the outer wall while maintaining a spaced apart relationship between the inner wall and the outer wall to define a cooling channel between the inner wall and the outer wall to conduct cooling air through the airfoil. The airfoil wherein the pedestal may comprise a nickel-based superalloy or a cobalt-based superalloy.

In some embodiments the airfoil may comprise a plurality of fill caps welded to an outer surface of the outer wall to form a cap weld joint located opposite the outer weld joints along the outer wall to smooth concave features formed in the outer wall during welding of the pedestals to the outer wall. The outer wall may comprise a plurality of cooling holes spaced apart from the pedestals and extending between the cooling channel and an outer surface of the outer wall. The inner wall may be formed to include cooling holes spaced apart from the pedestals and opening into the cooling channel.

According to another aspect of the present invention a dual wall component for use in a gas turbine engine is taught. The dual wall component may comprise an inner wall, an outer wall spaced apart from the inner wall to form a cooling channel between the inner wall and the outer wall, and a plurality of spaced apart pedestals that extend from the inner wall to the outer wall through the cooling channel, each pedestal welded to the inner wall to form an inner weld joint and welded to the outer wall to form an outer weld joint. The plurality of pedestals may be spaced apart from one another. In some embodiments, the pedestal may comprise a nickel-based superalloy or a cobalt-based superalloy.

In some embodiments the dual wall component may further comprise a plurality of fill caps welded to the outer surface of the outer wall to form a cap weld joint located opposite the outer weld joints along the outer wall. The outer wall may include a plurality of cooling holes spaced apart from the pedestals and opening into the cooling channel. The inner wall may include cooling holes spaced apart from the pedestals and opening into the cooling channel.

BRIEF DESCRIPTION OF THE DRAWINGS

FIG. 1 is a perspective view of a blade adapted for use in a gas turbine engine showing that the blade includes a root, a platform, and an airfoil;

FIG. 2 is a cross-sectional view of the airfoil from FIG. 1 taken along line 2-2 showing that the airfoil includes an inner support wall, an outer shield wall, and a plurality of pedestals welded to the inner support wall and outer shield wall so that the outer shield wall is supported by the inner support wall while maintaining cooling air passages between the outer shield wall and inner support wall;

FIG. 3 is an enlarged view of a portion of FIG. 2 showing that each pedestal is welded to the inner support wall forming an inner weld joint and welded to the outer shield wall forming an outer weld joint;

DETAILED DESCRIPTION OF THE DRAWINGS

Figure 4:
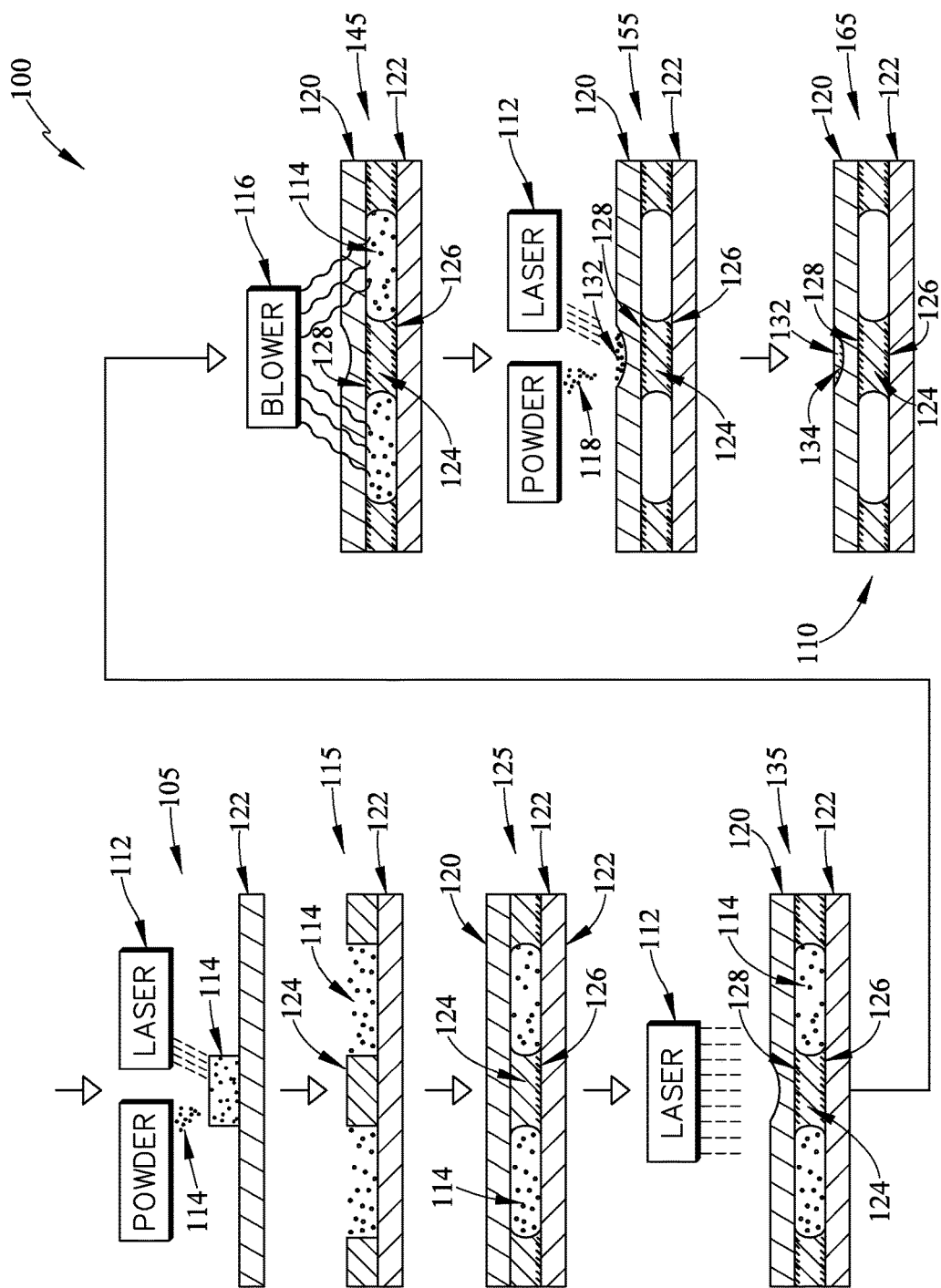
FIG. 4 is a partially diagrammatic view illustrative of a method of forming a dual wall component for use in a gas turbine engine.

For the purposes of promoting an understanding of the principles of the disclosure, reference will now be made to a number of illustrative embodiments illustrated in the drawings and specific language will be used to describe the same.

A dual wall component and a method for making a dual wall component are described herein. A dual wall component may be used as a turbine blade, a compressor blade, a combustor tile, or anywhere in a gas turbine engine where a support component adapted to include a heat shield may be needed. An illustrative dual wall component such as a dual wall blade 10 adapted for use in a gas turbine engine is shown in FIG. 1. The blade 10 may include a root 12, a platform 14 coupled to the root 12, and an airfoil 16 coupled to the platform 14. The platform 14 may connect the root 12 to the airfoil 16 and may separate the root 12 from the airfoil 16 so that gasses passing over the airfoil 16 may be blocked from moving down around the root 12 as suggested in FIG. 1. The airfoil 16 may be shaped aerodynamically to interact with gasses moving over the blade 10.

In the illustrative embodiment, the airfoil 16 of the blade 10 may include an inner wall 22, an outer wall 20, and a plurality of pedestals 24 for transmitting load between the inner wall 22 and the outer wall 20 as shown in FIGS. 2 and 3. The inner wall 22 and the outer wall 20 may be spaced apart by the plurality of pedestals 24. The space between the pedestals 24 may form cooling channels 26 that allow cooling air to flow between the inner wall 22 and the outer wall 20. High temperatures may be beneficial to a gas turbine engine, so it may be necessary to allow air to flow between the inner wall 22 and the outer wall 20 keeping the blade 10 cooler than the surrounding high temperature environment.

The inner wall 22 may include an inner surface 21, and an outer surface 23 opposite the inner surface 21 of the inner wall 22 as shown in FIG. 3. The inner surface 21 of the inner wall 22 may be positioned to interact with the core of the blade 10. The outer surface 23 of the inner wall 21 may be positioned to interact with the pedestals 24 and the cooling channels 26. An inner weld joint 28 may join the outer surface 23 of the inner wall 21 to the pedestal 24 as shown in FIG. 3. The inner wall 22 may act as a support wall for supporting the airfoil 16 and may be composed of nickel-based superalloy, cobalt based superalloy, nickel aluminides, titanium aluminides, or any other suitable material. The inner wall 22 may include cooling holes 19a, 19b, 19c spaced apart from the pedestals 24 and opening into the cooling channel 26 to conduct cooling air through the airfoil 10 as shown in FIGS. 2 and 3.

The inner weld joint 28 may be an interface where two or more pieces of metal may be physically joined together or metallurgically bonded. The weld joint may include a butt joint, a T-joint, a lap joint, a corner joint, an edge joint, or any other suitable joint formed by welding. The inner weld joint 28 may create the metallurgical bond between the outer surface of the inner wall 21 and the pedestal 24, wherein the inner weld joint 28 may include materials from both the outer surface 23 of the inner wall 22 and the pedestal 24.

The outer wall 20 may include an inner surface 25, and an outer surface 27 opposite the inner surface 25 of the outer wall 20 as shown in FIG. 3. The outer surface 27 of the outer wall 20 may be positioned to interact with the high temperature environment surround the dual wall component, such as the blade 10 and may act as a heat shield for the inner wall 21. The inner surface 25 of the outer wall 20 may interact with the cooling channel 26 and the pedestal 24. An outer weld joint 30 may join the outer wall 20 and the pedestal 24 as shown in FIG. 3. The outer wall 20 may extend around the inner wall 22 to act as a heat shield for the inner wall 22. The outer wall 20 may be composed of nickel-based superalloy, cobalt based superalloy, nickel aluminide, titanium aluminide, or any other suitable material. The outer wall 20 may be adapted to include a plurality of cooling holes 18a, 18b, 18c spaced apart from the pedestals 24 and opening into the cooling channel 26 to conduct cooling air through the airfoil 10.

The outer weld joint 30 may be an interface where two or more pieces of metal may be physically joined together or metallurgically bonded. The weld joints may include a butt joint, a T-joint, a lap joint, a corner joint, and an edge joint, or any other suitable joint formed by welding. The outer weld joint 30 may create the metallurgical bond between the inner surface 25 of the outer wall 20 and the pedestal 24. The outer weld joint 30 may be a combination of the material used to form the outer wall 20 such as a nickel-based superalloy, a cobalt based superalloy, or any other suitable material and the material used to form the pedestal 24, wherein the outer weld joint 30 may include materials from both the inner surface 25 of the outer wall 20 and the pedestal 24.

The pedestals 24 or features may be bonded to the outer surface 23 of the inner wall 22 by the inner weld joints 28 and the inner surface 25 of the outer wall 20 by the outer weld joints 30. The pedestals 24 may extend from the outer surface 23 of the inner wall 22 to the inner surface 25 of the outer wall 20 to transmit loads between the inner wall 22 and the outer wall 20 while maintaining a spaced apart relationship between the inner wall 22 and the outer wall 20, as shown in FIGS. 2 and 3. The pedestals 24 may include nickel-based superalloy, cobalt-based superalloy, or any other suitable material.

The outer weld joint 30 may cause a distortion of the outer surface 27 of the outer wall 20 such that there may be internal tensile stress and contraction causing concavity along the outer surface of the outer wall 27. A plurality of fill caps 32 and cap weld joints 34 may be included along the outer surface 27 of the outer wall 20 to smooth the outer surface of the outer wall 27. The fill caps 32 and cap weld joints 30 and may be located along the outer surface 27 of the outer wall 20 opposite the outer weld joints 30. The fill caps 32 may be included to smooth concave features formed in the outer wall 20 during welding of the pedestals 24 to the outer wall 20 as described herein. The fill caps 32 may include a cap weld joint 34 wherein the powder fill may be welded or metallurgically bonded to the outer surface of the outer wall 20. The fill caps 32 allow for a smooth surface along the outer surface of the outer wall 20.

A dual wall component may be used in a gas turbine engine to act as a heat shield between a heat source and a load bearing structure. The support wall of the dual wall component may provide support to the component while the shield wall may shield the component from the heat source. In some non-limiting examples, such dual wall component may be adapted to provide turbine blade or vanes, combustor liners and tiles, or other assemblies in the gas turbine engine where a support structure and a heat source are located in close proximity.

Currently, a dual wall component may be produced using single crystal manufacturing techniques. The single crystal structure may be a solid material in which the entire structure of the crystal lattice is continuous and unbroken to the edges. The methods described herein may produce an amorphous structure which may lack the long-range order characteristic of a crystal structure. Rather than being a single structure the dual wall component described herein may include weld joints such as the inner weld joint 28 and the outer weld joint 30 shown in FIG. 3. The weld joints 28, 30 may be a fusion of two materials and may be visibly distinguishable, whereas a single crystal structure may include a single piece of material and may not include a fusion of two materials. Alternatively, the weld joints 28, 30 may be a fusion of the same material and may not be visibly distinguishable.

Figure 5:
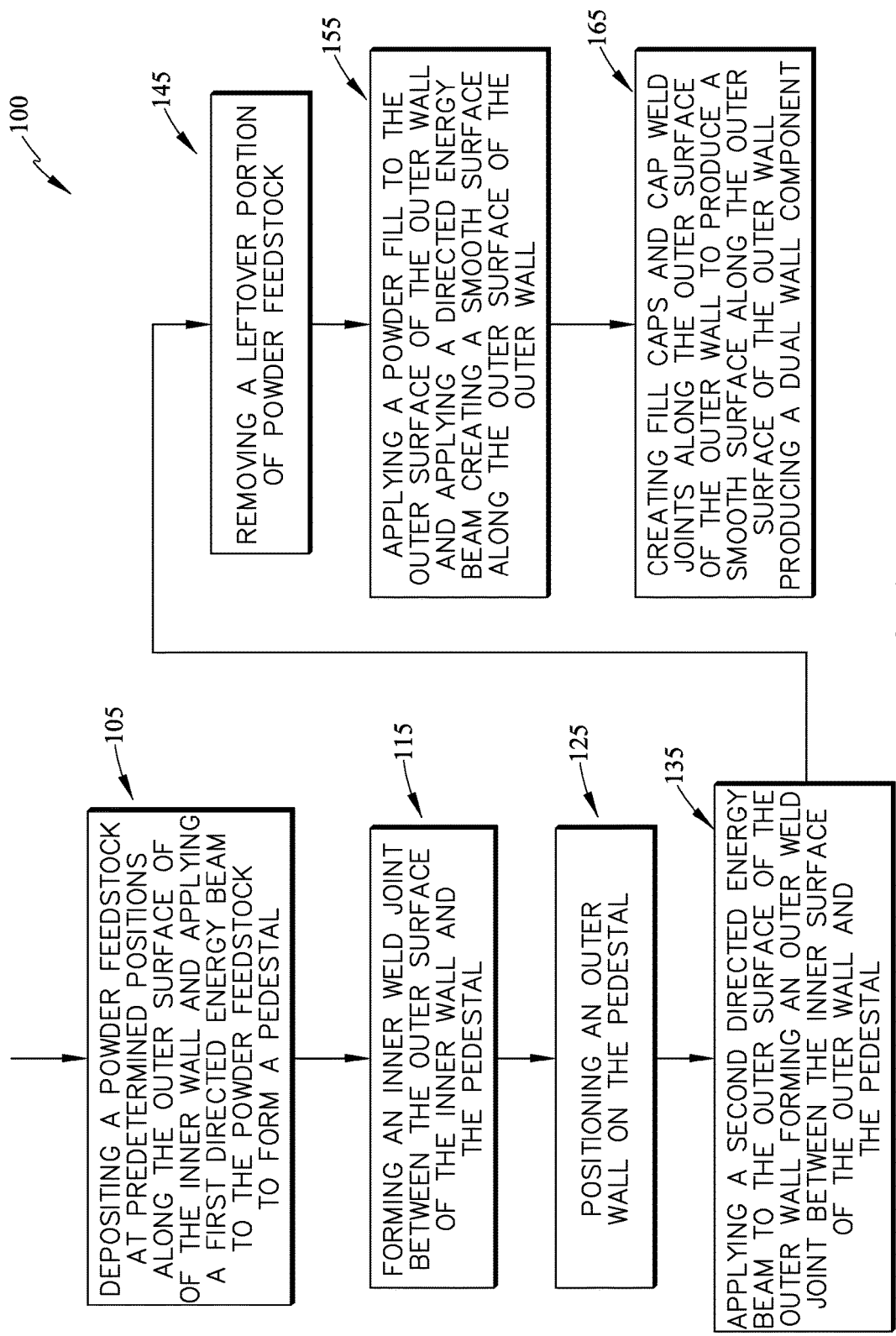
FIG. 5 is a block diagram of the method of forming a dual wall component for use in a gas turbine engine as shown in FIG. 4.

One illustrative method 100 for producing a dual wall component, such as the blade 10 of FIGS. 1-3 is shown in FIGS. 4 and 5. Simultaneously forming and bonding the support structure, such as the pedestal 24 between an inner wall 22 and an outer wall 20 shown in FIGS. 2 and 3, through the use of directed energy welding may be described herein. Throughout the method 100 a laser is illustratively described, but any type of directed energy source such as an electron beam may be used for the method described herein. A directed energy beam may emit highly focused energy and may transfer the energy to an object.

In a step 105 of the method 100, powder feedstock 114 may be deposited at predetermined locations along the outer surface of the inner wall 122 as suggested illustratively in FIG. 4 and diagrammatically in FIG. 5. The powder feedstock 114 may be deposited as a powder bed creating a layer of powder or the powder feedstock 114 may be deposited at the predetermined locations. The powder feedstock 114 may include nickel-based superalloys, cobalt-based superalloys, or any suitable combination of superalloys. The predetermined locations for depositing the powder feedstock 114 may be determined based on load of the flow requirements and heat load at specific areas within the airfoil or any other suitable parameters for forming a dual wall component. Alternatively, the powder feedstock 114 may be deposited using blown powder directed energy deposition. Blown powder directed energy deposition may use a laser 112 to melt blown powder into the pedestals 124 by blowing the powder feedstock 114 into a melt pool created by the laser 112.

In a step 115 of the method 100, a directed energy beam, illustratively shown as a laser 112, may be used to create pedestals 124 along the outer surface of the inner wall 122 where the powder bed may have been deposited as suggested illustratively in FIG. 4 and diagrammatically in FIG. 5. Layers of powder feedstock 114 may be added sequentially until either a partial pedestal or a complete pedestal 124 may be formed. Alternatively, pedestals may be formed by blowing powder into a melt pool created by a laser or other directed energy beam instead of pre-placing the powder. Optionally, incomplete pedestals or partial pedestals may be previously formed by brazing, heat treating, or any other suitable process for creating a pedestal along the outer surface of the inner wall 122. A layer of powder feedstock 114 may be added to act as a support between the inner wall 122 and the outer wall 120. The layer of powder feedstock 114 may be heated by the energy beam such as the laser 112 described herein to the incomplete pedestal to create a surface for bonding the pedestal 124 to the inner surface of the outer wall 120.

In one embodiment, the layers of powder feedstock 114 may be placed at predetermined locations, and in another illustrative embodiment, the powder feedstock 114 may be placed as a layer along the outer surface of the inner wall 122. The layer of powder feedstock 114 may be placed along the entire outer surface of the inner wall 122 and heated only at predetermined locations along the outer surface of the inner wall 122 to create the pedestals 124. In another embodiment the layer of powder feedstock 114 may be deposited at the predetermined locations and heated. The powder feedstock 114 not heated by the laser 112 to create the pedestals 124 may be removed as described herein. Optionally, the layer of powder feedstock 114 may be heated by the laser 112 after positioning the outer wall 120 as described in Step 125 such that the pedestals 124 are created and welded to the inner surface of the outer wall 120 and the outer surface of the inner wall 122 simultaneously.

In step 115 of the method 100, the pedestals 124 may be formed as described herein and also may be welded to the outer surface of the inner wall 122 as suggested illustratively in FIG. 4 and diagrammatically in FIG. 5. Pedestals 124 may be formed by welding the pedestal 124 to the outer surface of the inner wall 122 forming an inner weld joint 115. The inner weld joint may be any type of weld joint such as butt joint, a T-joint, a lap joint, a corner joint, and an edge joint. Welding the pedestal 124 to the outer surface of the inner wall 122 may be performed by laser welding, heat treating, brazing, electron beam welding, or any other suitable method for creating a joint between two metal components. Welding the pedestal 124 to the outer surface of the inner wall 124 may be performed using the same energy source (e.g., laser 112) as the other steps described herein to form the component more quickly and with greater precision.

The step 125 may include positioning an outer wall 120 on the pedestals as suggested illustratively in FIG. 4 and diagrammatically in FIG. 5. Optionally, a layer of metal powder or any other suitable binding material may be used prior to positioning the outer wall 120 along the pedestals 124 to assist in welding the inner surface of the outer wall 120 to the pedestals 124. The binding material may be added to the pedestals 124 as a final layer along the outer edge of the pedestal 114 and may be heated prior to adding the outer wall 120 or contemporaneously with adding the outer wall 120. In some embodiments, leftover powder feedstock 114 may be used as a binder material or the powder feedstock 114 may be used as a support for the outer wall 120. The powder feedstock 114 may act as a binding material or the binding material may be a second material deposited along the pedestals 124. In other embodiments, the powder may be added to an incomplete pedestal 124 formed via other suitable methods.

In a step 135 of the method 100, a directed energy beam such as the laser 112 may be used at the predetermined locations along the outer surface of the outer wall 120 to form an outer weld joint 128 between the inner surface of the outer wall 120 and the pedestal 124 as suggested illustratively in FIG. 4 and diagrammatically in FIG. 5. The laser 112 may be preprogrammed to recognize the locations for providing directed energy because the laser 112 may have been used to create the pedestals 124 in the step 105 of the method 100 and may have also been used to form the inner weld joint between the pedestal 124 and the outer surface of the inner wall 120. The same directed energy source may be used to complete each step of the methods described herein.

In the optional step 145 of the method 100, the powder feedstock 114 or the binding material may be removed by blowing the powder feedstock 114 out using a blower 116 as suggested illustratively in FIG. 4 and diagrammatically in FIG. 5. Air may be pushed between the inner wall 122 and the outer wall 120 such that the powder is removed from the space between the inner wall 122 and the outer wall 120. The powder feedstock 114 or the binding material may be removed by other suitable means for example the material may be suspended in a liquid or chemically dissolved to be removed from the airfoil 110. The powder feedstock 114 may also be removed by pumping a fluid between the inner wall and the outer wall. Optionally, the powder feedstock 114 or the binding material may be preserved and not removed from the airfoil 110.

Welding the pedestal 124 to the inner surface of the outer wall 120 may create a concave feature 130 which may be filled subsequently or simultaneously. In welding the pedestal 112 to the inner surface of the outer wall 120 and to the outer surface of the inner wall 124, the inner weld joint 126 and the outer weld joint 128 may pull powder feedstock 114 and/or portions of the outer wall 120, inner wall 122, and pedestal 124 into the joints 126, 128 leaving the concave feature 130 along the outer surface of the outer wall 120 as suggested illustratively in FIG. 4 and diagrammatically in FIG. 5.

In a step 155 of the method 100, the powder fill 118 may be deposited in the concave feature 130 along the outer surface of the outer wall 120 such that the powder fill 118 may fill the concave feature 130 as suggested illustratively in FIG. 4 and diagrammatically in FIG. 5. The powder fill 118 may be deposited as a powder bed and subsequently heated by laser 112. The directed energy beam from the laser 112 may be used to weld the extra powder fill 118 to the outer surface of the outer wall 120 creating a smooth surface along the outer surface of the outer wall 120. In another embodiment, the powder fill 118 may be added as blown powder to a melt pool along the outer surface of the outer wall 120. The melt pool may metallurgically bond to the outer surface of the outer wall 120 creating a fill cap 132 and a cap weld joint 134 as shown in step 165 of the method 100 and may create a smooth surface along the outer surface of the outer wall 120.

In the step 165 of the method 100, a dual wall airfoil 110 including a plurality of spaced apart pedestals 124 for transmitting the load between the inner wall 122 and the outer wall 120 may be produced by the methods described herein. The dual wall airfoil 110 may include a fill cap 132 and a cap weld joint 134 which may be formed by the addition of the powder fill 118 in step 155 of the method 100. Optionally, in a step, the same preprogrammed laser 112 described herein may be used to drill the cooling holes along both the inner wall 124 and the outer wall 120.

Laser welding may utilize minimum heat input with a high penetration which may allow for minimal shrinkage and distortion of the work piece. Another advantage of laser welding may be the ability to weld in areas difficult to reach with other techniques. Laser welding may map the areas for applying the directed energy beam such that the same laser may be used throughout the entire process of creating a dual wall structure.

Cast dual-wall structures can be difficult to manufacture with thin walls and/or fine details due to limitations in the investment casting process. A ceramic core may be used with the investment casting process, but the solid ceramic core may shift, causing dimensional issues. As well the solid ceramic core may be difficult to remove.

The method described herein may allow dual wall components to be quickly fabricated without long furnace diffusion cycles or complex investment casting cores. Materials fabricated by the method described herein may be less expensive to construct due to less expensive assemblies. As well the part fit-up may be more forgiving due to the compliant nature of the powdered metal layer. Complex shapes previously unattainable may be constructed through the use of multi-axis laser machines. Changes to the connecting structure and the shape may be made with one change to the laser tool path.

A superalloy or high-performance alloy may be an alloy that exhibits high temperature strength and oxidation resistance. The superalloys are based on group VIIIB elements with the three major classes being nickel-, iron-, and cobalt-based alloys. Superalloys may be commonly used in parts of gas turbine engines that are subject to high temperatures with high strength, excellent high temperature creep resistance, fatigue life, phase stability, and oxidation and corrosion resistance.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method for producing a dual wall component for a gas turbine engine, the method comprising:
   depositing powder feedstock at predetermined positions on an inner wall,
   applying a first directed energy beam onto the powder feedstock to create pedestals and form inner weld joints between an outer surface of the inner wall and the pedestals,
   positioning an outer wall on the pedestals, and
   welding the pedestals to an inner surface of the outer wall by applying a second directed energy beam onto an outer surface of the outer wall at predetermined positions corresponding to the pedestals to form outer weld joints between the inner surface of the outer wall and the pedestals.

2. The method of claim 1, wherein the first directed energy beam and the second directed energy beam are supplied by a single energy source.

3. The method of claim 1, wherein the powder feedstock is deposited using blown powder directed energy deposition.

4. The method of claim 1, further comprising depositing powder fill onto the outer surface of the inner wall between the pedestals to support the outer wall when the outer wall is positioned on the pedestals and to assist with welding the inner surface of the outer wall to the pedestal.

5. The method of claim 4, wherein the powder feedstock is a nickel-based superalloy or a cobalt-based superalloy.

6. The method of claim 1, further comprising removing a leftover portion of the powder feedstock after formation of the inner weld joint between the pedestal and the outer surface of the inner wall and after formation of the outer weld joint between the pedestal and the inner surface of the outer wall.

7. The method of claim 6, wherein removing the leftover portion of the powder feedstock is performed by suspending the powder in a liquid.

8. The method of claim 6, wherein removing the powder feedstock comprises pumping fluid between the inner wall and the outer wall.

9. The method of claim 1, wherein a concave feature is formed along the outer surface of the outer wall.

10. The method of claim 9, further comprising filling in the concave features along the outer surface of the outer wall with a powder fill and applying a third directed energy beam with a single energy source to the powder fill to create a fill cap weld joint to form a smooth surface along the outer surface of the outer wall.

11. An airfoil for use in a gas turbine engine, the airfoil comprising:
an inner wall;
an outer wall that extends around the inner wall to act as a heat shield for the inner wall;
a plurality of spaced apart pedestals welded to an outer surface of the inner wall to form an inner weld joint and welded to an inner surface of the outer wall to form an outer weld joint, wherein the pedestals transmit loads between the inner wall and the outer wall while maintaining a spaced apart relationship between the inner wall and the outer wall to define a cooling channel between the inner wall and the outer wall to conduct cooling air through the airfoil; and
a plurality of fill caps welded to an outer surface of the outer wall to form a cap weld joint located opposite the outer weld joints along the outer wall to smooth concave features formed in the outer wall during welding of the pedestals to the outer wall.

12. The airfoil of claim 11, wherein the pedestal comprises a nickel-based superalloy or a cobalt-based superalloy.

13. The airfoil of claim 11, wherein the outer wall comprises a plurality of cooling holes spaced apart from the pedestals and extending between the cooling channel and an outer surface of the outer wall.

14. The airfoil of claim 11, wherein the inner wall is formed to include cooling holes spaced apart from the pedestals and opening into the cooling channel.

15. A dual wall component for use in a gas turbine engine, the dual wall component comprising:
an inner wall;
an outer wall spaced apart from the inner wall to form a cooling channel between the inner wall and the outer wall;
a plurality of spaced apart pedestals that extend from the inner wall to the outer wall through the cooling channel, each pedestal welded to the inner wall to form an inner weld joint and welded to the outer wall to form an outer weld joint; and
a plurality of fill caps welded to the outer surface of the outer wall to form a cap weld joint located opposite the outer weld joints along the outer wall.

16. The component of claim 15, wherein the plurality of pedestals are spaced apart from one another.

17. The component of claim 15, wherein the pedestal comprises a nickel-based superalloy or a cobalt-based superalloy.

18. The component of claim 15, wherein the outer wall includes a plurality of cooling holes spaced apart from the pedestals and opening into the cooling channel.

* * * * *